(12) United States Patent
Chen et al.

(10) Patent No.: US 7,778,172 B2
(45) Date of Patent: Aug. 17, 2010

(54) HOME NETWORKING SYSTEM AND ADMISSION CONTROL METHOD THEREOF

(75) Inventors: Jie-Min Chen, Taipei (TW); Kai-Wen Tien, Tainan (TW)

(73) Assignee: Quanta Computer, Inc. (TW)

( * ) Notice: Subject to any disclaimer, the term of this patent is extended or adjusted under 35 U.S.C. 154(b) by 204 days.

(21) Appl. No.: 12/219,501

(22) Filed: Jul. 23, 2008

(65) Prior Publication Data

US 2009/0180385 A1    Jul. 16, 2009

(30) Foreign Application Priority Data

Jan. 11, 2008    (TW) .............................. 97101109 A

(51) Int. Cl.
  *H04L 1/00*    (2006.01)
(52) U.S. Cl. ...................... 370/230; 370/235
(58) Field of Classification Search ....................... None
See application file for complete search history.

(56) References Cited

U.S. PATENT DOCUMENTS 7,366,097 B2 * 4/2008 Zuberi ........................ 370/231
7,643,414 B1 * 1/2010 Minhazuddin ............... 370/230
7,693,157 B2 * 4/2010 Zuberi et al. ........... 370/395.41

OTHER PUBLICATIONS

Proutiere, QoS in multi-service wireless network-A state of the art, Information Society Technologies (IST)-6th Framework Programme, 189 pages, 2004.*

* cited by examiner

*Primary Examiner*—Frank Duong
(74) *Attorney, Agent, or Firm*—Thomas, Kayden, Horstemeyer & Risley, LLP.

(57) ABSTRACT

The invention discloses a home networking system and an admission control method for the home networking system. First, a first request information representative of a first traffic request for a terminal station is received. The first request information includes a first padding information column which includes a first routing path, a first required bandwidth, and a first compression format corresponding to the first required bandwidth. Subsequently, according to the first routing path and the first required bandwidth, it is judged whether one available bandwidth allocated to each link of the first routing path satisfies the first required bandwidth. If YES, the first traffic in the first compression format is admitted.

18 Claims, 6 Drawing Sheets

HOME NETWORKING SYSTEM AND ADMISSION CONTROL METHOD THEREOF

BACKGROUND OF THE INVENTION

1. Field of the Invention

The invention relates to a home networking system and an admission control method thereof. More particularly, the system and the admission control method thereof can enhance the quality of service of a home networking system.

2. Description of the Prior Art

In recent years, multimedia entertainments are considered primary applications in a digital home. With the popularity of computers, the popularity of wide-band networks and home networking systems being enhanced, and consumer electronics such as digital cameras, digital video cameras and MP3 players being on hot sales, the more effective sharing and managing of multimedia information has been an urgent issue.

A home networking system is the core of the digital home and is in communication with media servers, base stations (e.g. access point, AP), and terminal equipments, such as computers and other electronic equipments with communication abilities. The media servers provide various video and audio data, such as music, movies, films, and images. The terminal equipments receive the video and audio data from the base stations through wired or wireless networks.

Please refer to FIG. 1. FIG. 1 is a schematic diagram of a packet 1 format applied to a conventional home networking system. As shown in FIG. 1, the packet 1 consists of a media access control header (MAC header) 10, an Internet protocol header (IP header) 12, and data 14. The video and audio data are transmitted in the home networking system according to MAC addresses and IP addresses of terminal equipments.

In a conventional local area network, a random back-off mechanism is used before transmissions of packets to achieve collision avoidance. The IP header includes a contention window (CW) column and an inter-frame space (IFS) column, which determines a waiting time before a packet is transmitted, i.e. the collision avoidance is made through random back-off mechanism. However, under the condition that the transmission probability of each packet is equal, as soon as network congestion is brought about, a real-time packet can not be transmitted immediately, causing the decline of the network quality.

Therefore, the main scope of the invention is to provide a home networking system and an admission control method thereof, to solve the above-mentioned problems.

SUMMARY OF THE INVENTION

One scope of the invention is to provide a home networking system and an admission control method thereof.

According to an embodiment of the invention, it is related to a home networking system. The home networking system includes a media server and a plurality of base stations. The media server is adapted to serve a plurality of terminal stations. Each of the terminal stations is capable of linking to the media server through one of the base stations.

The media server receives first request information from a terminal station corresponding to a base station. The first request information is representative of a first traffic request for the terminal station and includes a first padding information column including a first routing path, a first required bandwidth and a first compression format corresponding to the first required bandwidth. According to the first routing path and the first required bandwidth, the media server judges whether one available bandwidth allocated to each link of the first routing path by the base station satisfies the first required bandwidth. If YES, the media server admits the first traffic request in the first compression format.

According to an embodiment of the invention, it is related to an admission control method for a home networking system. The home networking system includes a media server adapted to serve a plurality of terminal stations. The home networking system also includes a plurality of base stations, and each of the terminal stations is capable of linking to the media server through one of the base stations.

Firstly, first request information is received from a terminal station corresponding to a base station. The first request information is representative of a first traffic request for the terminal station and includes a first padding information column including a first routing path, a first required bandwidth and a first compression format corresponding to the first required bandwidth.

Subsequently, according to the first routing path and the first required bandwidth, it is judged whether one available bandwidth allocated to each link of the first routing path by the base station satisfies the first required bandwidth. If YES, the first traffic request in the first compression format is admitted.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
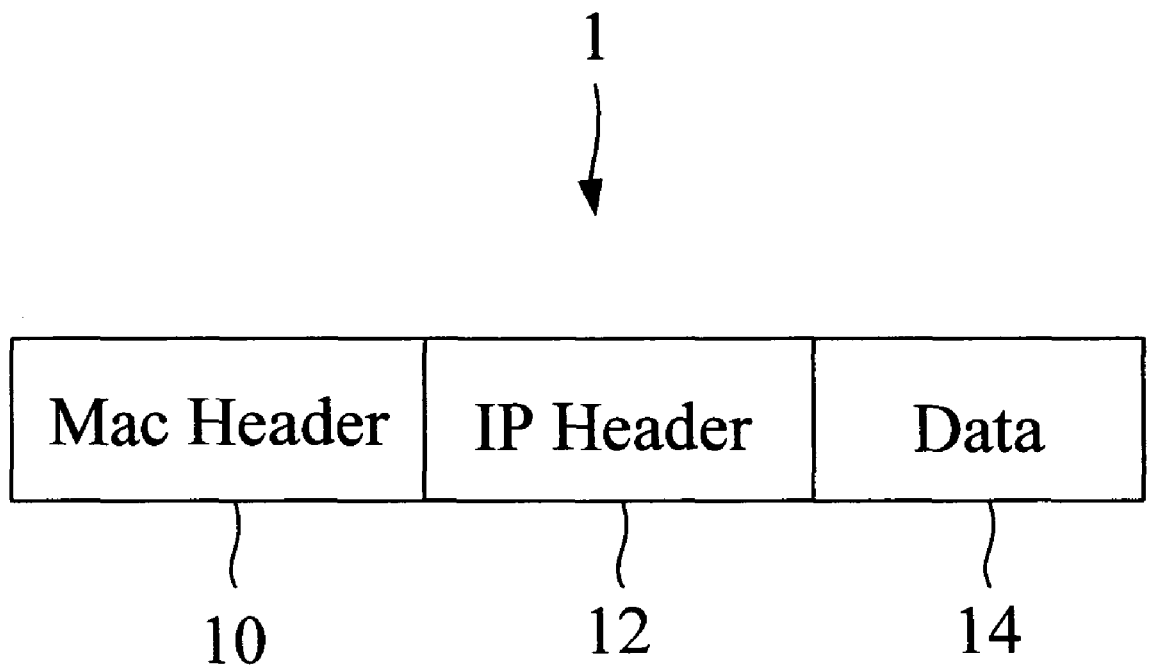
FIG. 1 is a schematic diagram of a packet format applied to a conventional home networking system.
Figure 2:
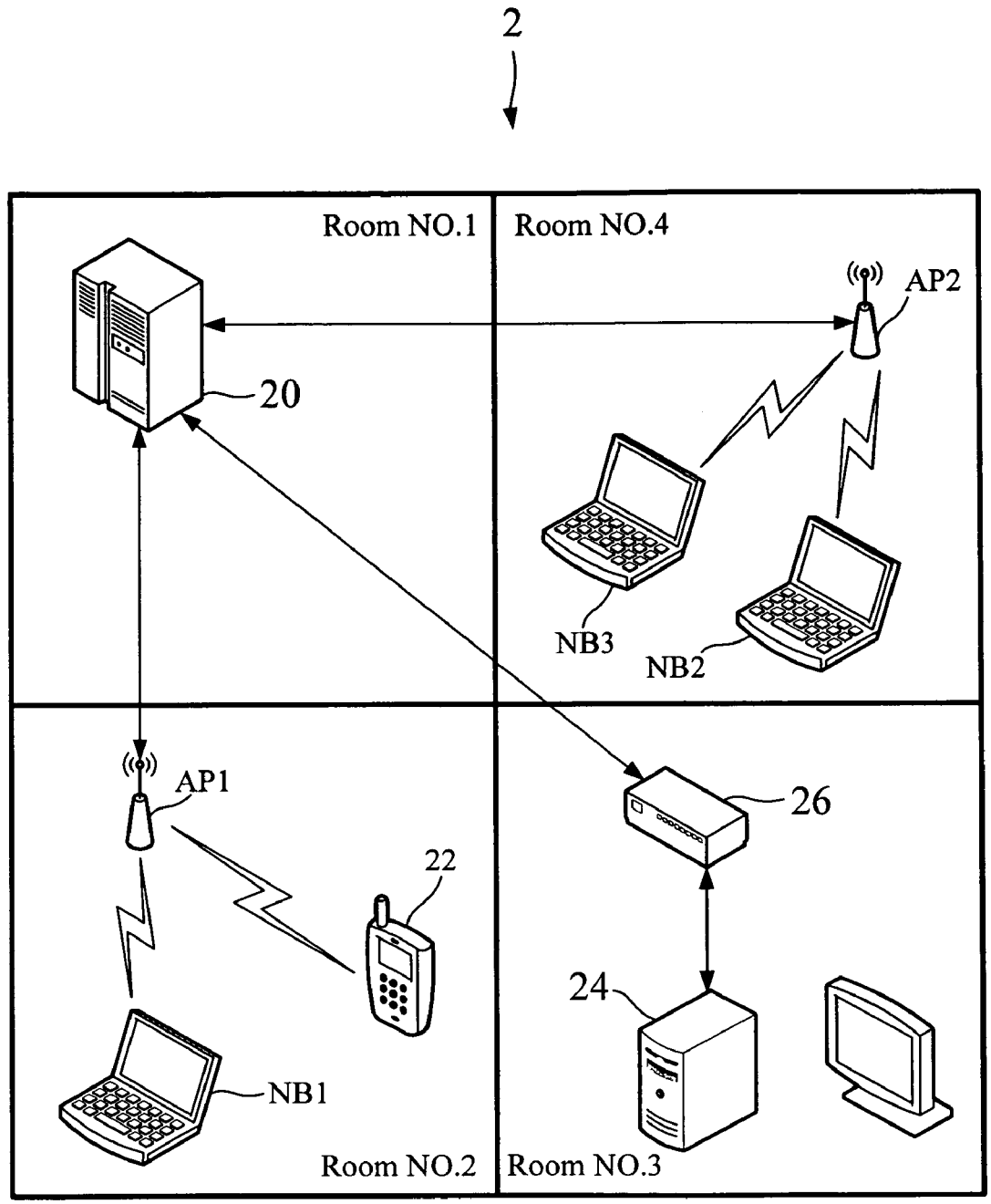
FIG. 2 is a schematic diagram illustrating the home networking system according to an embodiment of the invention.

Please refer to FIG. 2. FIG. 2 is a schematic diagram illustrating the home networking system 2 according to an embodiment of the invention.

As shown in FIG. 2, the home networking system 2 includes a media server 20 in room NO.1 and adapted to serve a plurality of terminal stations. Terminal stations can be notebooks, such as NB1, and cell phone 22 in room NO.2, NB2 and NB3 in room NO.4, or PC (personal computer) 24 in room NO.3. The home networking system 2 also includes a plurality of base stations for assigning bandwidths. The base stations can be access points, such as AP1 in room NO.2, AP2 in room NO.4, or PLC hub (power line communication hub) 26 in room NO.3. Each of the terminal stations is capable of linking to the media server 20 through one of the base stations.

In practical applications, through a local area network (LAN), the media server 20 can communicate with AP1 in room NO.2, AP2 in room NO.4, or PLC hub 26 in room NO.3. Each terminal station can communicate with a corresponding base station through a wired network or a wireless network. For example, in room NO.2, NB1 and cell phone 22 can wirelessly communicate with AP1 in a UWB (ultra wide band) protocol and in a Wi-Fi protocol, respectively. AP1 can communicate with the media server 20 through the LAN. In room NO.3, PC 24 can communicate with the PLC hub 26 through a power line network, and PLC hub 26 can communicate with the media server 20 through the LAN. In room NO.4, NB2 and NB3 can communicate with AP2 through the LAN and a Bluetooth network, respectively. AP2 can communicate with the media server 20 through the LAN.

Figure 3:
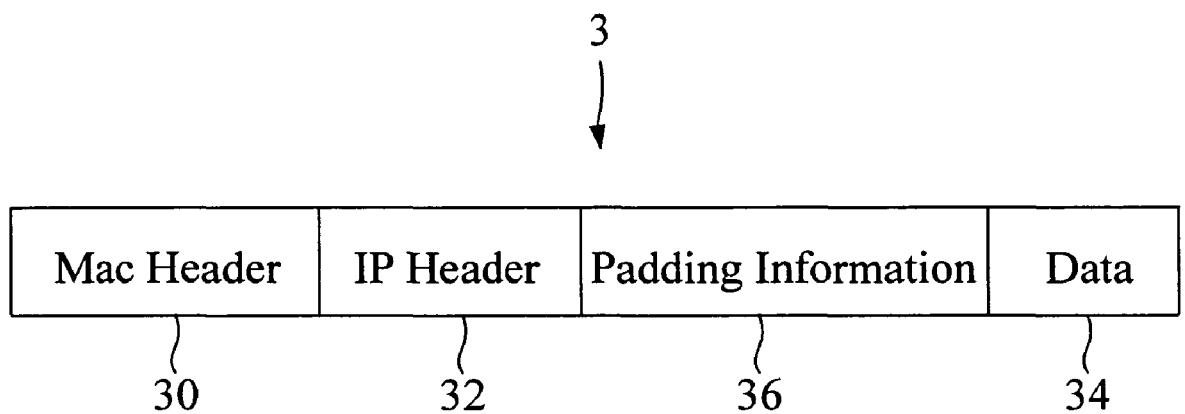
FIG. 3 is a schematic diagram of the packet applied to the home networking system according to the invention.

In the home networking system 2, data is transmitted in a packet format. Please refer to FIG. 3. FIG. 3 is a schematic diagram of the packet 3 applied to the home networking system 2 according to the invention. Besides the conventional MAC header 30, the IP header 32 and data 34, the packet 3 according to the invention particularly includes a padding information column 36, as shown in FIG. 3. The padding information column 36 can include a traffic type, a required bandwidth for the traffic type, an effective time of the traffic type, and a routing path. The traffic type can be an audio type including voice and music, a video type, or a data type.

The effective time is defined according to different traffic types. If transmission time of a packet in the networking system is longer than the effective time, the packet is abandoned to release bandwidths. For example, after NB3 transmits a packet including request information to the media server 20, the arrival time of the packet will be checked by the media server 20. If the arrival time is longer than the effective time of 300 micro seconds (300 ms), the packet will be abandoned; if NO, the packet will be transmitted to AP2, and the arrival time of the packet will be checked again by AP2. If the arrival time is longer than the effective time, the packet will be abandoned; if NO, the packet will be transmitted to NB3.

In one embodiment, the padding information column 36 can be introduced after the MAC header 30 and the IP header 32, but before data 34. According to the padding information column 36, the media server 20 judges whether to start transmitting the request information from terminal stations, i.e. note books, cell phones, or PCs. In other words, an admission control mechanism of the media server 20 is judged in accordance with the padding information column 36.

Figure 4:
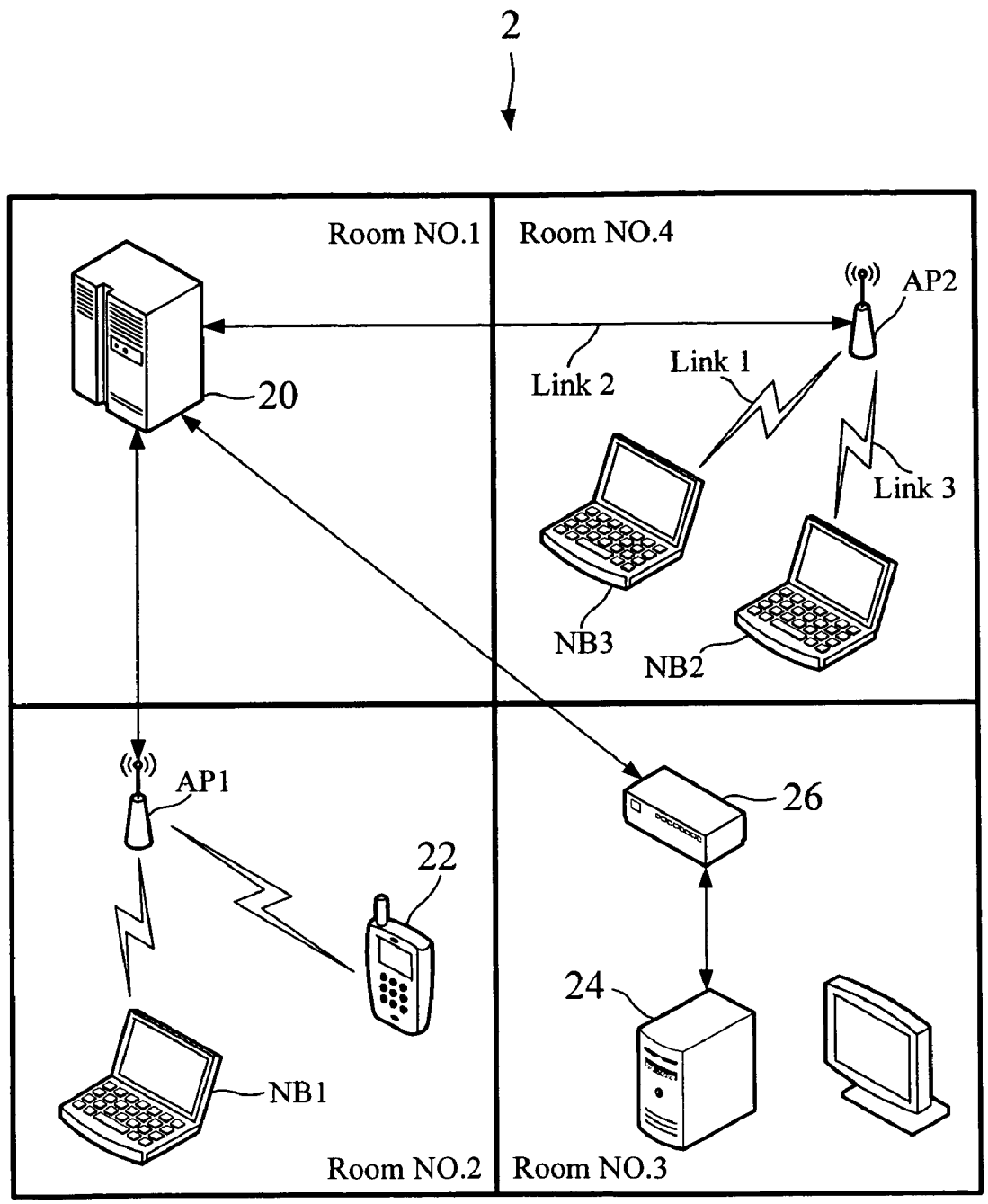
FIG. 4 is a schematic diagram illustrating the admission control mechanism of the home networking system according to the invention.

Please refer to FIG. 4. FIG. 4 is a schematic diagram illustrating the admission control mechanism of the home networking system 2 according to the invention.

The media server 20 receives first request information from a terminal station corresponding to a base station. The first request information is contained in a first padding information column in a packet. The first request information is representative of a first traffic request for the terminal station and includes a first routing path, a first required bandwidth and a first compression format corresponding to the first required bandwidth.

Take FIG. 4 as an example. In room NO.4, NB3 requests first request information to AP2 for an Internet radio. The content of the first request information is as follows: the traffic type is a voice type; the first compression format, e.g. a first kind of codec, is utilized; the first required bandwidth corresponding to the first compression format, e.g. 64 Kbps; the effective time, e.g. 300 ms; and a start point of the first routing path is NB3. After the packet transmitted from NB3 is received by AP2, a point of AP2 is introduced into the first routing path to modify the first routing path. Meanwhile, the first routing path refers to "NB3→AP2". After the first routing path is modified, the packet including the first request information is transmitted from AP2 to the media server 20.

After the media server 20 receives the packet transmitted from AP2, the arrival time of the packet will be checked by the media server 20. If the arrival time goes beyond the effective time of 300 ms, the packet will be abandoned; if NO, according to the first routing path in the first padding information column, the media server 20 judges whether both (1) the available bandwidth allocated to a first link (link1) between NB3 and AP2, and (2) the available bandwidth allocated to a second link (link2) between AP2 and the media server 20 can satisfy the first required bandwidth. If YES, the media server 20 admits the first traffic request in the first compression format. Particularly, if the media server 20 admits the first traffic request in the first compression format, the media server 20 also sets a traffic priority in accordance with the traffic type, and then transmits the first traffic request based on the traffic priority.

It should be noted that after AP2 receives the packet transmitted from the media server 20, the arrival time of the packet will also be checked by AP2. If the arrival time does not go beyond the effective time 300 ms, AP2 would transmit the packet to NB3 based on the traffic priority; if YES, the packet will be abandoned. The traffic priority in the invention is set based on the parametric differences in the random back-off mechanism, such as the difference between the contention window (CW) column and the inter-frame space (IFS) column. In one embodiment, a voice-type traffic has the highest priority, i.e. the voice-type traffic has the least waiting time determined by the CW column and the IFS column. In addition, a video-type traffic type has the intermediate priority, and a data-type traffic type has the lowest priority.

If the media server 20 judges that not all available bandwidths satisfy the first required bandwidth, the media server 20 rejects the first traffic request to the terminal station. Then, the media server 20 selects a substitution procedure to overcome the problem of insufficient bandwidths.

In the substitution procedure according to one embodiment, the media server 20 checks whether another compression format requiring a less bandwidth is available, e.g. converting a DVD image format (higher bit-rate) to a VCD image format (lower bit-rate). If YES, the media server 20 receives from the terminal station the second request information representative of a second traffic request for the terminal station and including a second padding information column. The second padding information column includes the first routing path, a second required bandwidth less than the first required bandwidth and a second compression format corresponding to the second required bandwidth. Then, according to the first routing path and the second required bandwidth, the media server 20 judges whether one available bandwidth allocated to each link of the first routing path satisfies the second required bandwidth. If YES, the media server 20 admits the second traffic request in the second compression format.

In the substitution procedure according to one embodiment, the media server 20 notifies the base station corresponding to the terminal station to release bandwidths allocated to other terminal stations. For example, assuming that NB3 is the terminal station, and the bandwidth allocated to NB3 is not enough, the media server 20 will notify the AP corresponding to NB3, i.e. AP2, to release bandwidths allocated to other terminal stations, i.e. NB2. As the previous paragraph described, a method for NB2 to release bandwidths is to select a lower bit-rate compression format. Thereby, the bandwidth released from NB2 enables the bandwidth allocated to NB3 to satisfy the first required bandwidth.

In the substitution procedure according to one embodiment, the media server 20 judges whether one available bandwidth allocated to each link of a routing path in connection with the media server 20 of another terminal station (e.g. NB2) near the terminal station (e.g. NB3) satisfies the first required bandwidth. If YES, the media server 20 transmits location information relative to said another terminal station to the terminal station. For judging whether said another terminal station is nearby, the strength of received signals and the arrival time of received signals could be utilized for wireless network and wired network, respectively. Referring to FIG. 4, when the required bandwidth is not enough for the transmission of the internet radio to NB3, if one available bandwidth allocated to each link of a second routing path (e.g. link2 and link3) of NB2 at room NO.4 satisfies the first required bandwidth, the media server 20 transmits a packet including location information to NB3, so as to inform the user of NB3 that NB2 has better communication quality, and the user can obtain the first request information at NB2. The location information can be added in the padding information column of the packet which is transmitted to NB3.

In the substitution procedure according to one embodiment, the packet including the first request information is transmitted through other base stations to the terminal station. For example, if NB3 can communicate with AP1 and one available bandwidth allocated to each link of a third routing path of AP1 satisfies the first required bandwidth, the media server 20 can transmit the packet to NB3 through the third routing path of AP1.

Figure 5A:
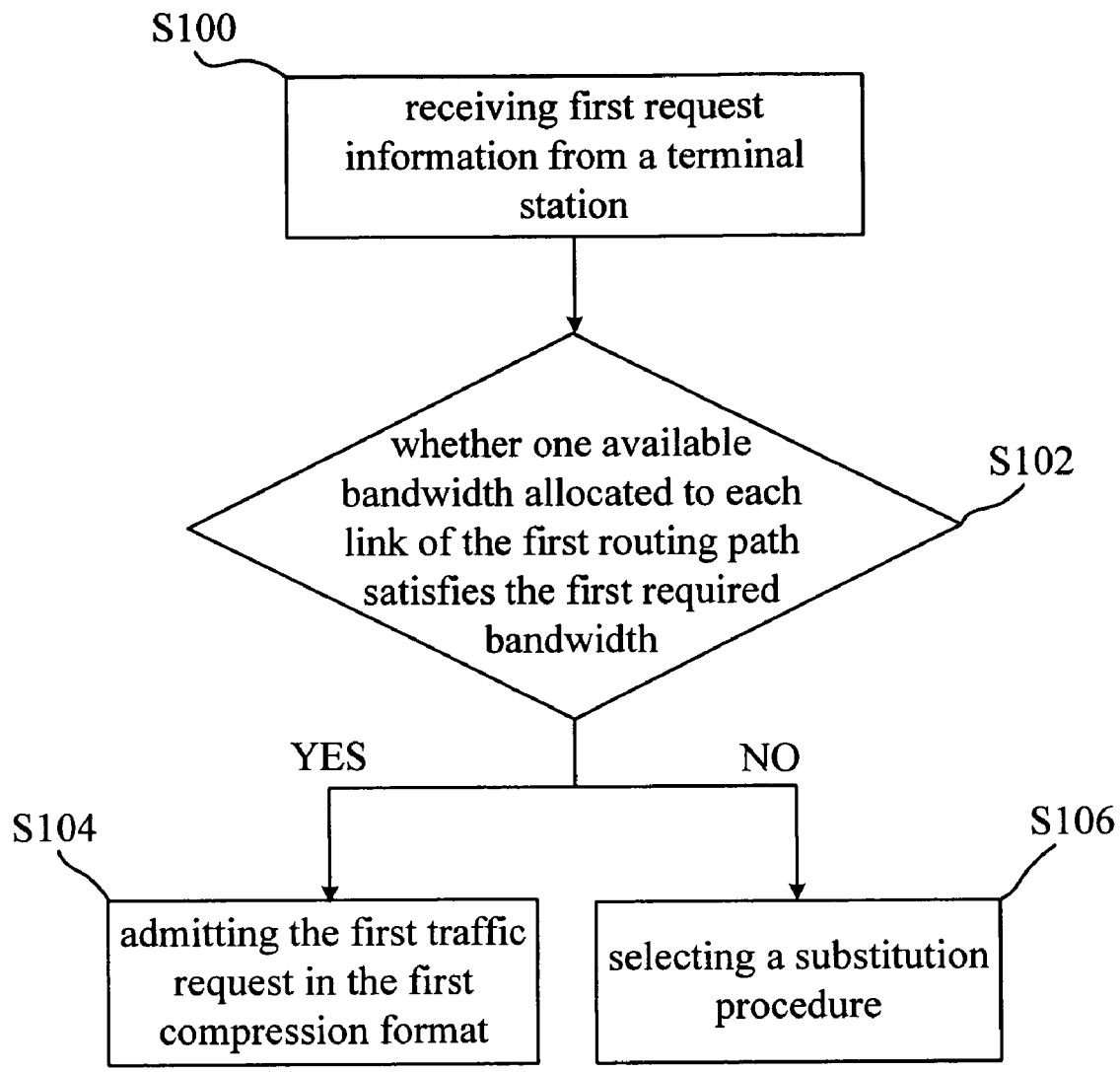
FIG. 5A shows a flow chart illustrating an admission control method for a home networking system according to another embodiment of the invention.

Please refer to FIG. 5A. FIG. 5A shows a flow chart illustrating an admission control method for a home networking system according to another embodiment of the invention. The home networking system includes a media server adapted to serve a plurality of terminal stations. The home networking system also includes a plurality of base stations, and each of the terminal stations is capable of linking to the media server through one of the base stations.

First, in step S100, first request information is received from a terminal station corresponding to a base station. The first request information is representative of a first traffic request for the terminal station and includes a first padding information column including a first routing path, a first required bandwidth and a first compression format corresponding to the first required bandwidth.

Subsequently, in step S102, according to the first routing path and the first required bandwidth, it is judged whether one available bandwidth allocated to each link of the first routing path by the base station satisfies the first required bandwidth.

If YES in step S102, the first traffic request in the first compression format is admitted in step S104. Particularly, if the first traffic request in the first compression format is admitted, a traffic priority is further set in accordance with the traffic type. If NO in step S102, a substitution procedure is selected in step S106 to overcome the problem of insufficient bandwidths.

Figure 5B:
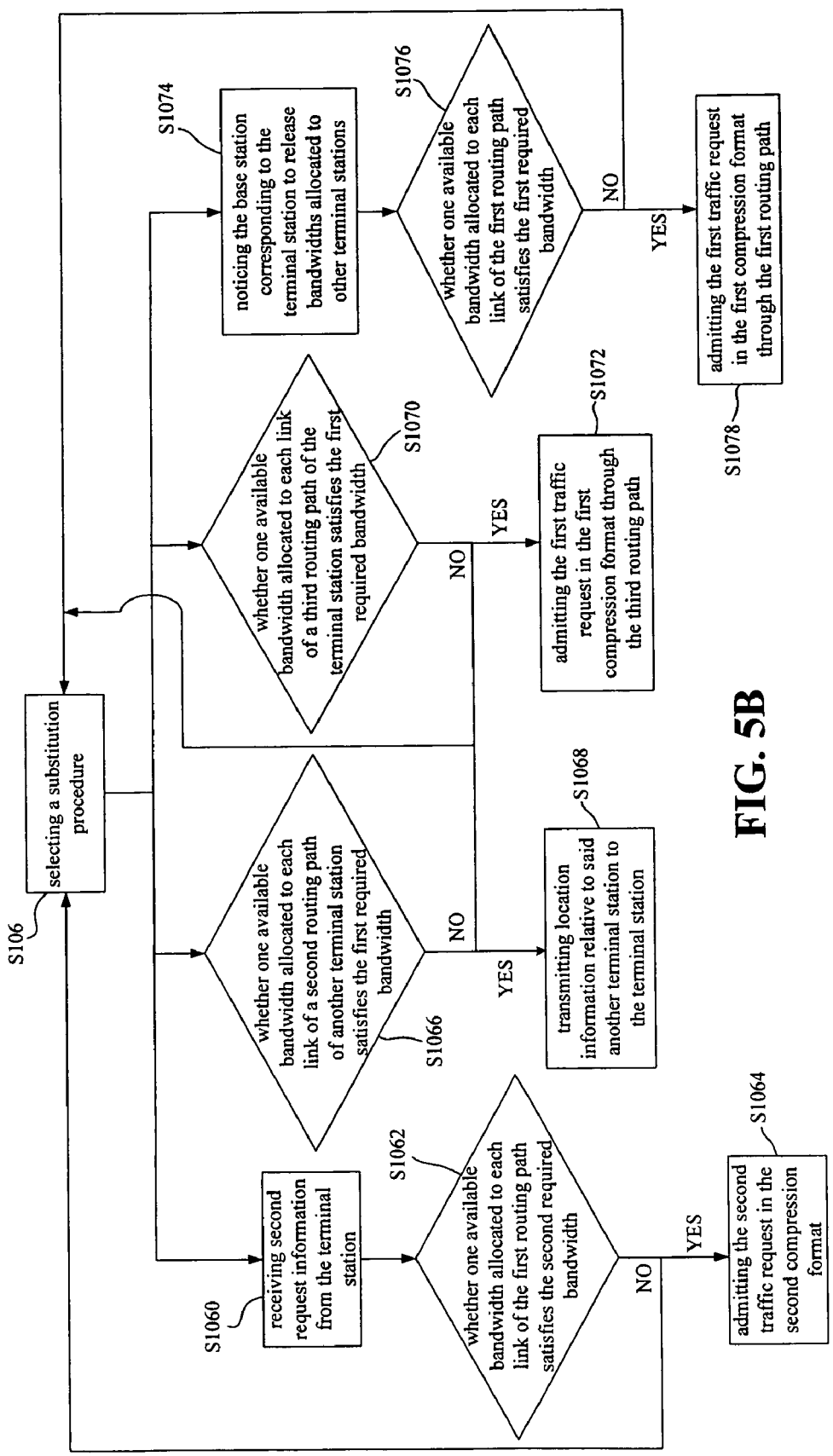
FIG. 5B shows a flow chart illustrating that step S106 in FIG. 5A includes sub-steps S1060~S1078.

Please refer to FIG. 5B. FIG. 5B shows a flow chart illustrating that step S106 in FIG. 5A includes sub-steps S1060~S1078. The substitution procedure can be illustrated by steps S1060~S1078, but not limited therein.

In one embodiment, second request information is received from the terminal station in step S1060. The second request information is representative of a second traffic request for the terminal station and includes a second padding information column which includes the first routing path, a second required bandwidth less than the first required bandwidth and a second compressing format corresponding to the second required bandwidth.

Subsequently, according to the first routing path and the second required bandwidth, it is judged that whether one available bandwidth allocated to each link of the first routing path satisfies the second required bandwidth in step S1062. If YES in step S1062, the second traffic request in the second compression format is admitted in step S1064.

In one embodiment, it is judged in step S1066 that whether one available bandwidth allocated to each link of a second routing path of another terminal station by the base station satisfies the first required bandwidth. If YES in step S1066, location information relative to said another terminal station is transmitted to the terminal station in step S1068.

In one embodiment, it is judged in step S1070 that whether one available bandwidth allocated to each link of a third routing path of the terminal station satisfies the first required bandwidth. It is noted that the third routing path means that the packet including the first request information is transmitted through other base stations to the terminal station. If YES in step S1070, the first traffic request in the first compression format is admitted through the third routing path in step S1072.

In one embodiment, in step S1074, a notice is transmitted to the base station corresponding to the terminal station to release bandwidths allocated to other terminal stations. Subsequently, it is judged in step S1076 that whether one available bandwidth allocated to each link of the first routing path satisfies the first required bandwidth. If YES in step S1076, the first traffic request in the first compression format is admitted through the first routing path in step S1078.

Compared to the prior art, proposals are provided in the invention to improve the quality of service in the home networking system. The invention not only meets transmission requirements for multimedia data, but is also applicable in various indoor wireless and wired networks. According to the invention, controls and managements of data transmission are realized by using the admission control mechanism of the media server and the traffic priority. In particular, a padding information column is added in the packet of the invention such that the admission control mechanism of the media server is judged in accordance with the padding information column. In addition to the padding information column, the traffic priority is set by parameters in the random back-off mechanism such that the home networking system according to the invention provides better quality of service than the prior art.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An admission control method for a home networking system, said method comprising the steps of:
    (a) from a terminal station corresponding to a base station, receiving a first request information representative of a first traffic request for the terminal station, wherein the first request information comprises a first padding information column comprising a first routing path, a first required bandwidth and a first compression format corresponding to the first required bandwidth;
    (b) according to the first routing path and the first required bandwidth, judging whether one available bandwidth allocated to each link of the first routing path by the base station satisfies the first required bandwidth; and
    (c) if YES in step (b), admitting the first traffic request in the first compression format.

2. The method of claim 1, further comprising the steps of:
    (d) if NO in step (b), rejecting the first traffic request to the terminal station and selecting a substitution procedure.

3. The method of claim 2, wherein the substitution procedure further comprises the steps of:
    (e) from the terminal station, receiving a second request information representative of a second traffic request for the terminal station, wherein the second request information comprises a second padding information column comprising the first routing path, a second required bandwidth less than the first required bandwidth and a second compressing format corresponding to the second required bandwidth;

(f) according to the first routing path and the second required bandwidth, judging whether one available bandwidth allocated to each link of the first routing path satisfies the second required bandwidth; and (g) if YES in step (f), admitting the second traffic request in the second compression format through the first routing path.

4. The method of claim 2, wherein the substitution procedure further comprises the steps of:

(h) judging whether one available bandwidth allocated to each link of a second routing path of another terminal station by the base station satisfies the first required bandwidth; and (i) if YES in step (h), rejecting the first traffic request to the terminal station and transmitting a location information relative to said another terminal station to the terminal station.

5. The method of claim 2, wherein the substitution procedure further comprises the steps of:

(j) judging whether one available bandwidth allocated to each link of a third routing path of the terminal station by another base station satisfies the first required bandwidth; and (k) if YES in step (j), admitting the first traffic request in the first compression format through the third routing path.

6. The method of claim 2, wherein the substitution procedure further comprises the steps of:

(l) notifying the base station corresponding to the terminal station to release bandwidths allocated to other terminal stations;

(m) judging whether one available bandwidth allocated to each link of the first routing path satisfies the first required bandwidth; and (n) if YES in step (m), admitting the first traffic request in the first compression format through the first routing path.

7. The method of claim 1, wherein the first request information also comprises a traffic type which is one selected from the group consisting of an audio type, a video type and a data type.

8. The method of claim 1, before step (c), further setting a traffic priority in accordance with a traffic type and transmitting the first traffic request based on the traffic priority.

9. The method of claim 1, wherein the first request information also comprises an effective time of the first traffic request.

10. A home networking system, comprising:
a media server adapted to serve a plurality of terminal stations; and
a plurality of base stations, each of the terminal stations being capable of linking to the media server through one of the base stations;
wherein when the media server receives from a terminal station of the terminal stations, corresponding to a base station of the base stations, a first request information representative of a first traffic request for the terminal station and the first request information comprises a first padding information column comprising a first routing path, a first required bandwidth and a first compression format corresponding to the first required bandwidth, the media server judges, according to the first routing path and the first required bandwidth, whether one available bandwidth allocated to each link of the first routing path by the base station satisfies the first required bandwidth; if YES, the media server admits the first traffic request in the first compression format.

11. The home networking system of claim 10, wherein if the media server judges that said one available bandwidth does not satisfy the first required bandwidth, the media server rejects the first traffic request to the terminal station and selects a substitution procedure.

12. The home networking system of claim 11, wherein in the substitution procedure, the media server receives from the terminal station a second request information, representative of a second traffic request for the terminal station, comprising a second padding information column comprising the first routing path, a second required bandwidth less than the first required bandwidth and a second compression format corresponding to the second required bandwidth, the media server judges, according to the first routing path and the second required bandwidth, whether one available bandwidth allocated to each link of the first routing path satisfies the second required bandwidth; if YES, the media server admits the second traffic request in the second compression format through the first routing path.

13. The home networking system of claim 11, wherein in the substitution procedure, the media server judges whether one available bandwidth allocated to each link of a second routing path of another terminal station by the base station satisfies the first required bandwidth; if YES, the media server transmits a location information relative to said another terminal station to the terminal station.

14. The home networking system of claim 11, wherein in the substitution procedure, the media server judges whether one available bandwidth allocated to each link of a third routing path of the terminal station by another base station satisfies the first required bandwidth; if YES, the media server admits the first traffic request in the first compression format through the third routing path.

15. The home networking system of claim 11, wherein in the substitution procedure, the media server notices the base station corresponding to the terminal station to release bandwidths allocated to other terminal stations; then, the media server judges whether one available bandwidth allocated to each link of the first routing path satisfies the first required bandwidth; if YES, the media server admits the first traffic request in the first compression format through the first routing path.

16. The home networking system of claim 10, wherein the first request information also comprises a traffic type which is one selected from the group consisting of an audio type, a video type and a data type.

17. The home networking system of claim 10, wherein if the media server admits the first traffic request in the first compression format, the media server also sets a traffic priority in accordance with a traffic type, and transmits the first traffic request based on the traffic priority.

18. The home networking system of claim 10, wherein the first request information also comprises an effective time of the first traffic request.

* * * * *